United States Patent [19]
Dorenbosch et al.

[11] Patent Number: 6,084,866
[45] Date of Patent: Jul. 4, 2000

[54] METHOD AND APPARATUS IN A WIRELESS MESSAGING SYSTEM FOR MINIMIZING UNNECESSARY COMMUNICATIONS WITH COVERAGE ZONES OF DIFFERING SIZE AND DIFFERING BANDWIDTH CAPACITY WHEN ENTERED BY A MOBILE SUBSCRIBER UNIT

[75] Inventors: Jheroen Pieter Dorenbosch, Paradise; Thomas Casey Hill, Trophy Club, both of Tex.

[73] Assignee: Motorola, Inc., Schaumburg, Ill.

[21] Appl. No.: 09/010,014

[22] Filed: Jan. 21, 1998

[51] Int. Cl.$^7$ ....................................................... H04J 3/12
[52] U.S. Cl. ............................................ 370/331; 455/443
[58] Field of Search .................................... 709/239, 238; 395/200.69, 200.68; 370/468, 228, 237, 235, 331, 332; 379/221; 455/443, 436, 437, 438

[56] References Cited

U.S. PATENT DOCUMENTS

| | | | |
|---|---|---|---|
| 5,235,599 | 8/1993 | Nishimura et al. ........................ | 714/4 |
| 5,353,331 | 10/1994 | Emery et al. ............................ | 455/461 |
| 5,574,771 | 11/1996 | Driessen et al. ........................ | 455/413 |
| 5,590,118 | 12/1996 | Nederlof ................................. | 370/218 |
| 5,590,126 | 12/1996 | Mishra et al. .......................... | 370/329 |
| 5,649,289 | 7/1997 | Wang et al. ............................ | 455/31.3 |
| 5,675,577 | 10/1997 | Komatsu ................................. | 370/237 |
| 5,848,055 | 12/1998 | Fedyk et al. ............................ | 370/228 |
| 5,875,185 | 12/1996 | Wang et al. ............................ | 370/331 |
| 6,011,780 | 1/2000 | Vaman et al. .......................... | 370/237 |

*Primary Examiner*—Kenneth R. Coulter
*Attorney, Agent, or Firm*—R. Louis Breeden

[57] ABSTRACT

A subscriber unit (122) acquires (604) communications with a first network (102) of a messaging system, the first network able to communicate at a first bandwidth. Thereafter, the subscriber unit determines (606) that it momentarily needs to communicate at a second bandwidth higher than the first bandwidth. In response, the subscriber unit reacquires (612) communications with a second network (115) different from the first network and able to communicate at the second bandwidth.

22 Claims, 5 Drawing Sheets

METHOD AND APPARATUS IN A WIRELESS MESSAGING SYSTEM FOR MINIMIZING UNNECESSARY COMMUNICATIONS WITH COVERAGE ZONES OF DIFFERING SIZE AND DIFFERING BANDWIDTH CAPACITY WHEN ENTERED BY A MOBILE SUBSCRIBER UNIT

FIELD OF THE INVENTION

This invention relates in general to messaging systems, and more specifically to a method and apparatus for conditionally selecting a network which a subscriber unit will use for service.

BACKGROUND OF THE INVENTION

Current messaging systems are partitioned into coverage zones for delivery of messages to subscriber units. In a one-way messaging system a subscriber unit is typically assigned to a "home" coverage zone, to which all messages for the subscriber unit are routed unless the user of the subscriber unit requests temporary coverage in a different coverage zone, e.g., when traveling. In a two-way messaging system, a subscriber unit can sense when it is leaving the home coverage zone and can request registration in a new zone being entered. Thus, the two-way system can keep track of the subscriber unit's location and can route messages automatically.

Future messaging systems will incorporate multiple communications capabilities that will require different transmission bandwidths. For example, a simple numeric or alphanumeric message will require less bandwidth than a lengthy information services message or a FAX message. In general, higher bandwidth will correspond to shorter transmission range. This fact will allow for the integration of a relatively low bandwidth, wide area backbone messaging service network, with one or more higher bandwidth networks downtown, for example, and very high bandwidth networks in-building. Because the higher bandwidth and very high bandwidth networks are decoupled from one another and from the relatively low bandwidth backbone network, extensive reuse will boost system capacity enormously.

If such future systems were to be set up conventionally, the very high bandwidth networks would be treated as additional zones within the higher bandwidth networks, which in turn would be treated as additional zones within the low bandwidth network. Background scanning or an equivalent technique would allow the subscriber unit to detect when higher bandwidth service is available. The messaging system would keep track of the subscriber unit's location through registration messages sent by the subscriber unit whenever it enters a new zone. Because some of the zones would have a very small size (office size or smaller), the number of registrations would explode. Getting a cup of coffee, for example, could result in dozens of registrations while passing by one's colleagues' cubicles. Such an explosion of registrations would be disastrous, as little air time would be left for normal, non-registration messages.

Thus, what is needed is a method and apparatus that will allow multiple communications capabilities requiring multiple bandwidths to be provided without causing an explosion of registration messages.

SUMMARY OF THE INVENTION

An aspect of the present invention is a method in a messaging system for conditionally selecting a network which a subscriber unit will use for service. The method comprises in the subscriber unit the steps of acquiring communications with a first network of the messaging system, the first network able to communicate at a first bandwidth; and determining thereafter that the subscriber unit momentarily needs to communicate at a second bandwidth higher than the first bandwidth. The method further comprises, in response to the determining step, reacquiring communications with a second network different from the first network and able to communicate at the second bandwidth.

Another aspect of the present invention is a subscriber unit in a messaging system for conditionally selecting a network which the subscriber unit will use for service. The subscriber unit comprises a receiver for receiving an outbound message from a portion of the messaging system, and a processing system coupled to the receiver for processing the outbound message. The processing system is programmed to acquire communications with a first network of the messaging system, the first network able to communicate at a first bandwidth. The processing system is further programmed to determine thereafter that the subscriber unit momentarily needs to communicate at a second bandwidth higher than the first bandwidth; and, in response, to reacquire communications with a second network different from the first network and able to communicate at the second bandwidth.

Another aspect of the present invention is a controller in a first messaging network for conditionally selecting a network which a subscriber unit will use for service. The controller comprises an input interface for receiving a message from a message originator, and a processing system coupled to the input interface for processing the message. The controller further comprises a base station interface coupled to the processing system for transmitting the message. The processing system is programmed to evaluate a minimum bandwidth requirement for transmitting the message, and to send a notification to the subscriber unit specifying the minimum bandwidth required for receiving the message.

DETAILED DESCRIPTION OF THE DRAWINGS

Figure 1:
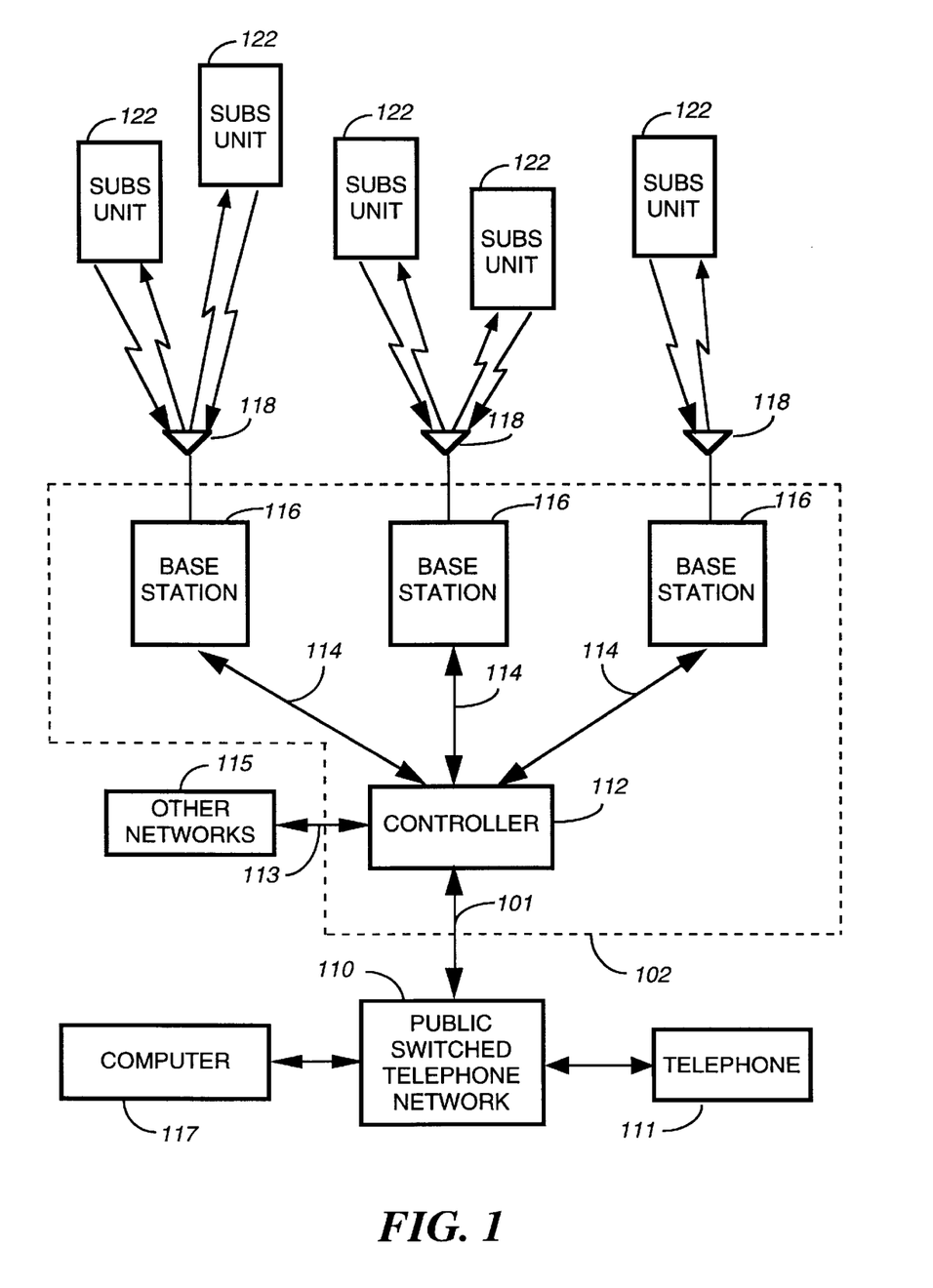
FIG. 1 is an electrical block diagram of an exemplary messaging system in accordance with the present invention.

Referring to FIG. 1, an electrical block diagram depicts an exemplary messaging system in accordance with the present invention comprising a network 102 including a controller 112 and a plurality of base stations 116, the messaging system also including a plurality of subscriber units 122, preferably having acknowledge-back capability. The base stations 116 preferably communicate with the subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc., and includes software modified in accordance with the present invention. The hardware of the base stations 116 is preferably a combination of the RF-Orchestra! transmitter and RF-Audience!™ receivers manufactured by Motorola, Inc. The subscriber units 122 are preferably similar to Tenor™ voice messaging units and Pagefinder™ data messaging units, also manufactured by Motorola, Inc., and having software modified in accordance with the present invention. It will be appreciated that other similar hardware can be utilized as well for the controller 112, the base stations 116, and the subscriber units 122.

Each of the base stations 116 transmits RF signals to the subscriber units 122 via a transceiver antenna 118. The base stations 116 preferably each receive RF signals from the plurality of subscriber units 122 via the transceiver antenna 118. The RF signals transmitted by the base stations 116 to the subscriber units 122 (outbound messages) comprise selective call addresses identifying the subscriber units 122, and voice and data messages originated by a caller, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs) and negative acknowledgments (NAKs), and unscheduled messages, such as registration requests. It will be appreciated that, alternatively, the network 102 can be a one-way (outbound only) network as well.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 or a conventional computer 117 coupled to the PSTN 110. It will be appreciated that, alternatively, other types of communication networks, e.g., packet switched networks and local area networks, can be utilized as well for transporting originated messages to the controller 112. The controller 112 also is preferably coupled to other networks 115, similar to the network 102 but capable of higher-bandwidth transmissions, through a communication link 113 for sending a message via the other networks 115 in accordance with the present invention, as described further below. It will be appreciated that, alternatively, the controller 112 can itself control some or all of the other networks 115 through additional communication links 114 coupled to additional higher-bandwidth base stations 116.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable protocols can be used as well. It will be further appreciated that, while the preferred embodiment for practicing the present invention is a two-way messaging system, portions of the present invention are applicable also to a one-way messaging system.

Figure 2:
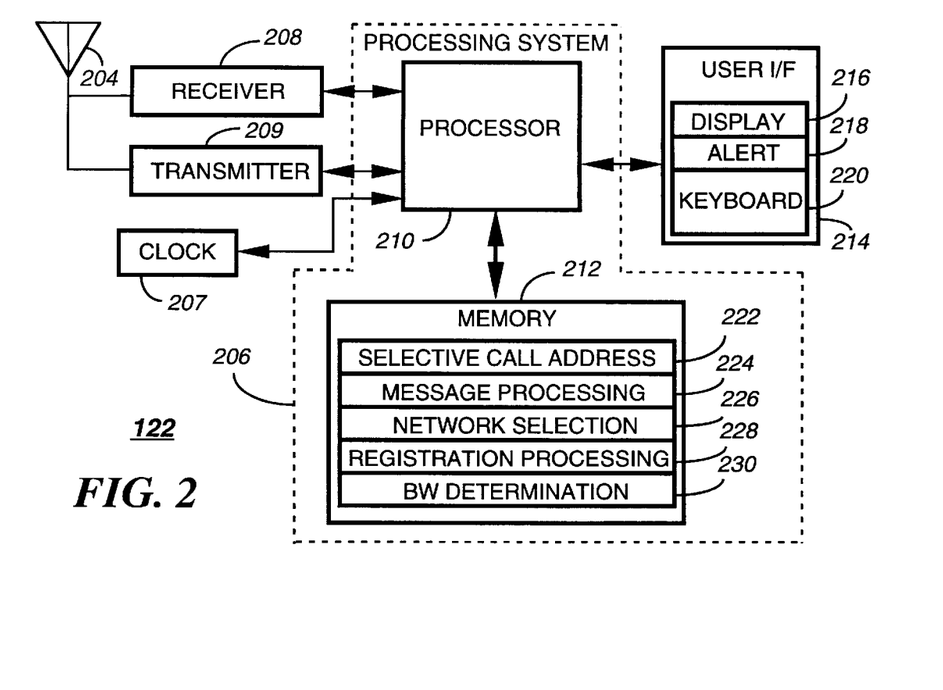
FIG. 2 is an electrical block diagram of an exemplary subscriber unit in accordance with the present invention.

FIG. 2 is an electrical block diagram of an exemplary subscriber unit 122 in accordance with the present invention. The subscriber unit 122 comprises an antenna 204 for intercepting an outbound message and for transmitting an inbound message. The antenna 204 is coupled to a conventional receiver 208 for receiving the outbound message and is also preferably coupled to a conventional transmitter 209 for transmitting the inbound message. The receiver 208 and the transmitter 209 are coupled to a processing system 206 for processing the outbound and inbound messages and for controlling the subscriber unit 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the subscriber unit 122. A conventional clock 207 is also coupled to the processing system 206 for supporting time keeping requirements of the subscriber unit 122. It will be appreciated that, alternatively, the user interface 214 can be eliminated in some applications, such as in an automobile anti-theft application, where the subscriber unit 122 preferably is hidden and operates automatically.

The processing system 206 comprises a conventional processor 210 and a conventional memory 212. The memory 212 comprises software elements and other variables for programming the processing system 206 in accordance with the present invention. The memory 212 preferably includes a selective call address 222 to which the subscriber unit 122 is responsive. In addition, the memory 212 includes a message processing element 224 for programming the processing system 206 to process messages through well-known techniques. The memory 212 further comprises a network selection element 226 for programming the processing system 206 to select a network 102, 115 which the subscriber unit 122 will use for service in accordance with the present invention. The memory 212 also includes a registration processing element 228 for programming the processing system 206 to process a registration of the subscriber unit 122 with a network 102, 115 in accordance with the present invention. In addition, the memory 212 includes a bandwidth determination element for programming the processing system 206 to determine a minimum bandwidth suitable for transmitting a particular message from the subscriber unit 122 to a network 102, 115.

Figure 3:
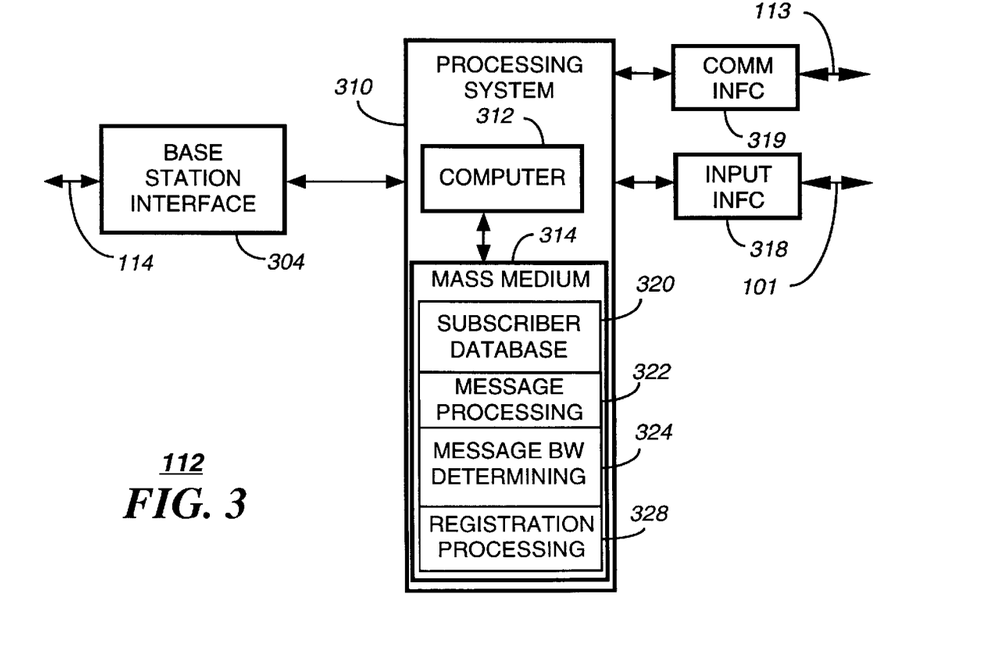
FIG. 3 is an electrical block diagram of an exemplary controller in accordance with the present invention.

FIG. 3 is an electrical block diagram of an exemplary controller 112 in accordance with the present invention. The controller 112 comprises a processing system 310 for executing the operations of the controller 112. The processing system 310 is coupled to a conventional input interface 318 for receiving messages through the telephone links 101. The processing system 310 is also coupled to a conventional base station interface 304 for controlling and communicating with the base stations 116 through the communication links 114. It will be appreciated that more than one base station interface 304 can be present, depending upon system size. In addition, the processing system 310 preferably is coupled to a conventional communication interface 319 for communicating with other networks 115 via the communication link 113, in accordance with the present invention.

The processing system 310 comprises a conventional computer 312 and a conventional mass storage medium 314. The mass storage medium 314 includes, for example, a subscriber database 320, comprising subscriber information such as addressing and programming options of the subscriber units 122. The computer 312 is preferably programmed by way of software included in the mass storage medium 314 for providing the operations and features required in accordance with the present invention. The computer 312 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the subscriber units 122, and protocol processing of messages destined for the subscriber units 122. The mass storage medium 314 is preferably a conventional hard disk mass storage device. It will be appreciated that other types of conventional computers 312 can be utilized, and that additional computers 312 and mass storage media 314 of the same or alternative type can be added as required to handle the processing requirements of the processing system 310.

The mass storage medium 314 preferably includes software and various databases utilized in accordance with the present invention. The mass storage medium 314 preferably includes a message processing element 322 for programming the processing system 310 to process messages through well-known techniques. The mass medium 314 also includes a message bandwidth determining element 324 for programming the processing system 310 to determine a minimum bandwidth required for transmitting a message from the network 102 controlled by the controller 112, to a subscriber unit 122 for which the message is intended. In addition, the mass medium 314 includes a registration processing element 328 for processing registrations and deregistrations of subscriber units 122 with the network 102 controlled by the controller 112 and with the other networks 115.

Figure 4:
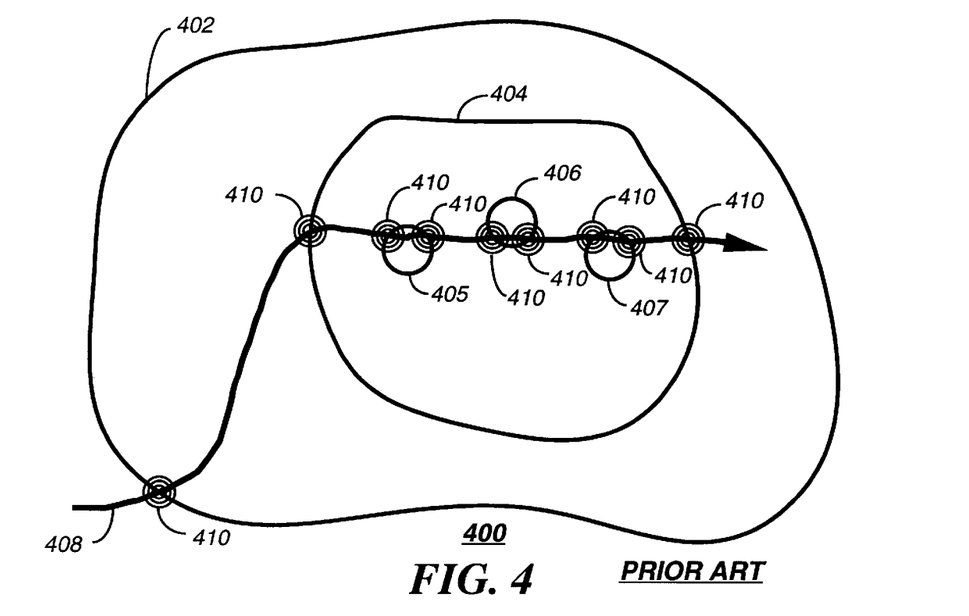
FIG. 4 is a plan view of a prior art multi-zone messaging system.

FIG. 4 is a plan view of a prior art multi-zone messaging system 400. The messaging system 400 includes an overall zone having an overall coverage area 402. The messaging system 400 further includes a medium zone having a medium coverage area 404. In addition, the messaging system 400 includes three small zones, each having an small coverage area 405, 406, 407. The prior art subscriber unit is programmed to register with the zone having the smallest coverage area 402, 404, 405, 406, 407 within range of the prior art subscriber unit. An example path traveled by the prior art subscriber unit as it moves through the messaging system 400 is depicted by a serpentine arrow 408. A registration 410 of the prior art subscriber unit is depicted by three concentric circles. Note that the prior art subscriber unit performs a registration 410 a total of nine times for the example path. Unfortunately, such registrations occur whether or not the subscriber unit has a message to be sent or received, and thus can waste a significant amount of air time and battery power.

Figure 5:
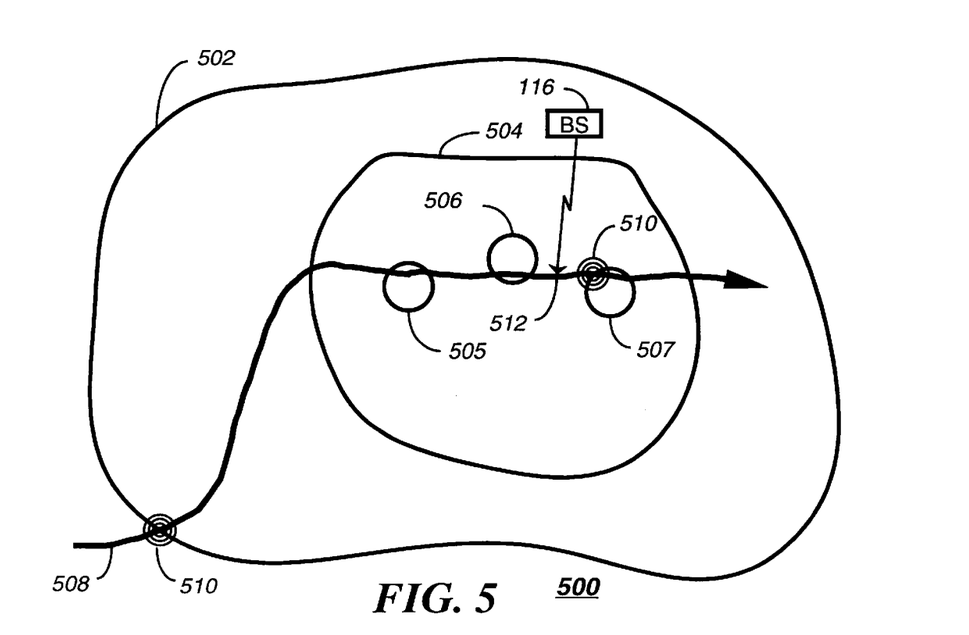
FIG. 5 is a plan view of an exemplary multi-zone, multi-bandwidth messaging system in accordance with the present invention.

FIG. 5 is a plan view of an exemplary multi-zone, multi-bandwidth messaging system 500 in accordance with the present invention. The messaging system 500 includes a low-bandwidth backbone network having a backbone coverage area 502, a medium-bandwidth network having a medium-bandwidth coverage area 504, and three high-bandwidth networks, each having a high-bandwidth coverage area 505, 506, 507. The subscriber unit 122 in accordance with the present invention preferably is programmed to register with and obtain service from the backbone network, unless the subscriber unit 122 determines that there is a need for higher bandwidth, either to send or receive a pending message. An example path traveled by the subscriber unit 122 as it moves through the messaging system 500 is depicted by a serpentine arrow 508. A registration 510 of the subscriber unit 122 is depicted by three concentric circles. Note that in following the same path as followed in FIG. 4, the subscriber unit 122 performs only two registrations 510. The first registration 510 occurs when the subscriber unit 122 enters the backbone coverage area 502. The second registration 510 occurs after a base station 116 of the backbone network informs the subscriber unit 122 at a point 512 along the example path that there is a message pending for the subscriber unit 122 that requires a high bandwidth for transmission. In response, the subscriber unit 122 performs the registration 510 with the high-bandwidth network when it enters the next high-bandwidth coverage area 507, and receives the message. Thus, the multi-zone, multi-bandwidth messaging system 500 in accordance with the present invention advantageously minimizes the number of registrations 510 taking place, because a registration 510 to a medium-bandwidth or high-bandwidth network occurs only when a need for medium or high bandwidth transmission has been determined.

Figure 6:
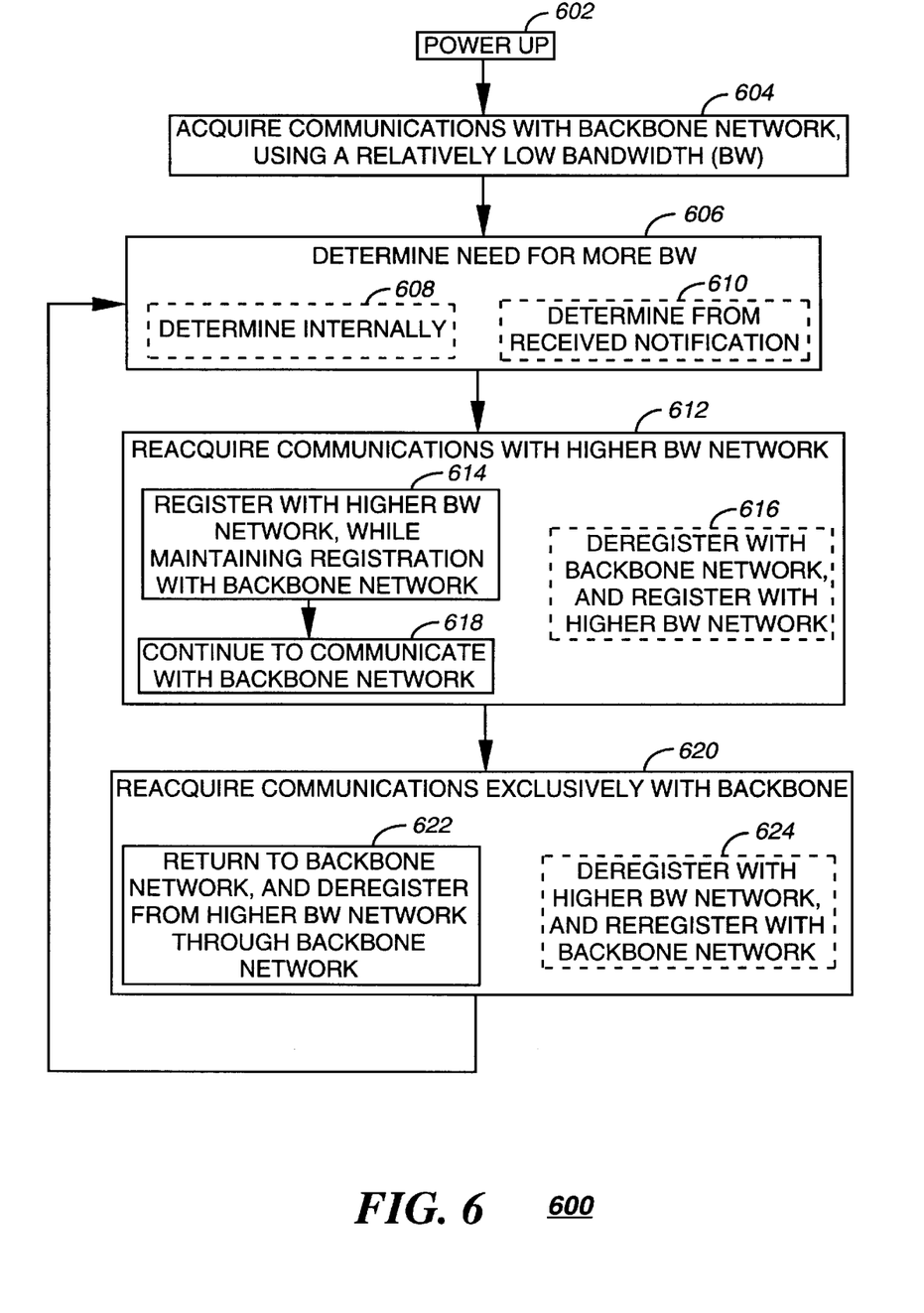
FIG. 6 is a flow chart depicting operation of the exemplary subscriber unit in accordance with the present invention.

FIG. 6 is a flow chart 600 depicting operation of the exemplary subscriber unit 122 in accordance with the present invention. The flow begins with a power up 602 of the subscriber unit 122. In response, the subscriber unit 122, using well-known techniques, acquires 604 communications with the backbone network, which utilizes a relatively low bandwidth for transmission. Some time later the subscriber unit 122 determines 606 a need for more transmission bandwidth than the backbone network is able to deliver. The determination can be made internally 608 by the subscriber unit 122, in response, for example, to the user entering a key sequence via the user interface 214, to transmit a high-bandwidth message, such as an image. Alternatively, the determination can be made in response to an external stimulus 610, e.g., a message received from the backbone network that there is a message requiring a specified minimum bandwidth waiting to be sent to the subscriber unit 122. The message can include one or more conditions. For example, the message can direct the subscriber unit 122 to switch to a higher bandwidth network if coming within range of the higher bandwidth network before five minutes have elapsed, else to ignore the message. In addition, a higher-bandwidth network may selectively require the subscriber unit 122 to register whenever the subscriber unit 122 comes within transmission range of the network, and may send a notification to the subscriber unit 122 that registration is required. This could be useful in two-way systems, for example, to track a stolen car in which the subscriber unit 122 is installed. It will be appreciated that two ways of receiving the notification to register are (1) through the backbone network and (2) during background scanning for another network through well-known techniques.

If the subscriber unit 122 is within range of the higher bandwidth network, the subscriber unit 122 then reacquires 612 communications with the higher bandwidth network. Preferably, the subscriber unit 122 does this by sending 614 a registration message to the higher bandwidth network, while maintaining registration with the backbone network. Preferably, while communicating with the higher bandwidth network the subscriber unit 122 also continues 618 to communicate with the backbone network on a shared basis. It will be appreciated that, alternatively, the subscriber unit 122 can send 616 a deregistration message to the backbone network and a registration message to the higher bandwidth network. It will be further appreciated that the subscriber unit 122 can be within range of a plurality of higher bandwidth networks capable of delivering the minimum required bandwidth, and that selection of one of the plurality of higher bandwidth networks can be based upon other parameters, such as delivery latency or traffic load associated with the networks and broadcast by the networks through well-known techniques.

After completing communications with the higher bandwidth network, the subscriber unit 122 preferably reacquires 620 communications exclusively with the backbone network. Preferably this is accomplished by returning 622 communications exclusively to the backbone network, and deregistering from the higher bandwidth network through the backbone network. Alternatively, when the subscriber unit 122 has changed registration from the backbone to the higher-bandwidth network, the subscriber unit can deregister 624 with the higher-bandwidth network, and reregister with the backbone network.

Figure 7:
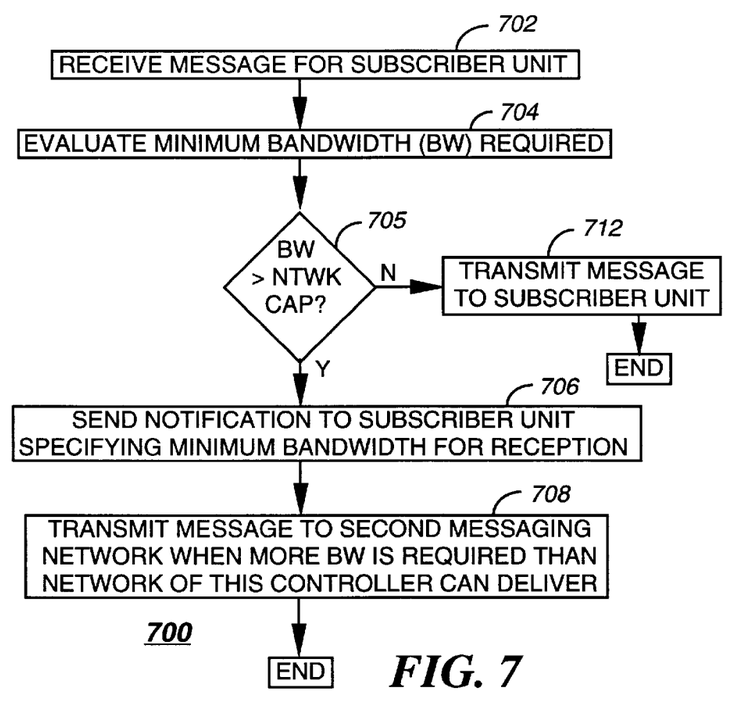
FIG. 7 is a flow chart depicting a first operation of the exemplary controller in accordance with the present invention.

FIG. 7 is a flow chart 700 depicting operation of the exemplary controller 112 in accordance with the present invention. Flow begins when the controller 112 receives 702 a message intended for the subscriber unit 122. The controller 112 then evaluates 704 the minimum bandwidth required for transmitting the message. This can be determined, for example, by the processing system 310 from a look-up table preprogrammed with message types and corresponding minimum bandwidths required. The controller 112 then checks 705 whether the required bandwidth is large compared to the capability of the network controlled by the controller 112. If the minimum bandwidth is beyond the capability of the network controlled by the controller 112, the controller sends 706 a notification to the subscriber unit 122 specifying the minimum bandwidth for reception. The controller 112 then also forwards 708 the message to the controller 112 of a second messaging network through the communication interface 319, and the process ends. If, on the other hand, at step 705 the minimum bandwidth is not beyond the capability of the network controlled by the controller 112, the controller then transmits 712 the message to the subscriber unit 122, and the process ends.

Figure 8:
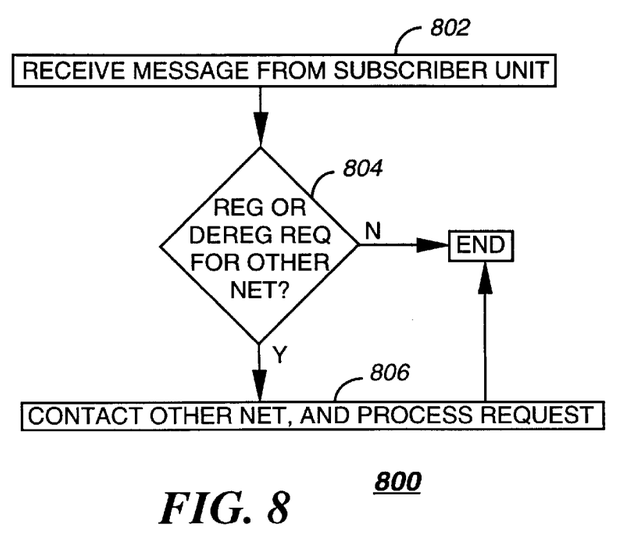
FIG. 8 is a flow chart depicting a second operation of the exemplary controller in accordance with the present invention.

FIG. 8 is a flow chart depicting a second operation of the exemplary controller 112 in accordance with the present invention. The flow begins when the controller 112 receives 802 a message from the subscriber unit 122. The controller 112 then checks 804 whether the message is a request to register or deregister the subscriber unit 122 with another network. If so, the controller 112 contacts 804 the other network through the communication interface 319, processes the request, and the flow ends. If the message is not a request to register or deregister the subscriber unit 122 with another network, the flow simply ends.

Thus, it should be clear from the preceding disclosure that the present invention provides a method and apparatus that allows multiple communications capabilities requiring multiple bandwidths to be provided without causing an explosion of registration messages. The method and apparatus advantageously allows a conditional selection of a network with which to communicate, based upon the bandwidth required.

Many modifications and variations of the present invention are possible in light of the above teachings. Thus, it is to be understood that, within the scope of the appended claims, the invention can be practiced other than as described herein above.

What is claimed is:

1. A method in a wireless messaging system having a plurality of coverage zones of differing size and of differing bandwidth capacity, the method for minimizing unnecessary communications with new zones entered by a subscriber unit moving through the wireless messaging system, the method comprising in the subscriber unit the steps of:

acquiring communications with a first coverage zone of the wireless messaging system, the first coverage zone able to communicate at a first bandwidth;

maintaining communications with the first coverage zone when the subscriber unit is within range of both the first coverage zone and another coverage zone having a higher bandwidth, when the higher bandwidth is not needed by the subscriber unit;

determining thereafter, in response to a presence of a high-bandwidth message to be communicated with the subscriber unit, that the subscriber unit temporarily needs to communicate at a second bandwidth higher than the first bandwidth; and in response, reacquiring communications with a second coverage zone different from the first coverage zone and able to communicate at the second bandwidth, wherein the second coverage zone is selected based upon a delivery latency of the second coverage zone.

2. The method of claim 1, wherein the step of reacquiring communications with the second coverage zone comprises the step of making a selection of the second coverage zone from a plurality of second coverage zones.

3. The method of claim 1, wherein the step of reacquiring communications with the second coverage zone comprises the step of making a selection of the second coverage zone from a plurality of second coverage zones, the selection based upon a traffic load of the second coverage zone.

4. The method of claim 1, wherein the step of reacquiring communications with the second coverage zone comprises the step of continuing to communicate with the first coverage zone.

5. The method of claim 1, further comprising in the subscriber unit the step of reacquiring communications with the first coverage zone after completing communications with the second coverage zone.

6. The method of claim 1, wherein the determining step comprises the step of receiving a notification from the first coverage zone that a specified minimum bandwidth is required for receiving a message.

7. The method of claim 1, wherein the determining step comprises the step of determining from information in the subscriber unit that the first bandwidth is insufficient for sending a message.

8. The method of claim 1, wherein the step of reacquiring communications with the second coverage zone comprises the step of registering for service with the second coverage zone.

9. The method of claim 1, wherein the step of reacquiring communications with the second coverage zone comprises the step of maintaining a registration for service with the first coverage zone.

10. The method of claim 1, wherein the step of reacquiring communications with the second coverage zone comprises the step of registering with the second coverage zone in response to receiving a notification indicating that the subscriber unit is required to register when coming within range of the second coverage zone.

11. The method of claim 1, further comprising in the subscriber unit, in response to leaving coverage of the second coverage zone, the steps of:

reacquiring communications with the first coverage zone; and deregistering from the second coverage zone through the first coverage zone.

12. A subscriber unit in a wireless messaging system having a plurality of coverage zones of differing size and of differing bandwidth capacity, the subscriber unit for minimizing unnecessary communications with new zones entered by the subscriber unit as it moves through the wireless messaging system, the subscriber unit comprising:

a receiver for receiving an outbound message from a portion of the messaging system; and a processing system coupled to the receiver for processing the outbound message, wherein the processing system is programmed to:

acquire communications with a first coverage zone of the messaging system, the first coverage zone able to communicate at a first bandwidth;

maintain communications with the first coverage zone when the subscriber unit is within range of both the first coverage zone and another coverage zone having a higher bandwidth, when the higher bandwidth is not needed by the subscriber unit;

determine thereafter, in response to a presence of a high-bandwidth message to be communicated by the subscriber unit, that the subscriber unit temporarily needs to communicate at a second bandwidth higher than the first bandwidth; and in response, reacquire communications with a second coverage zone different from the first coverage zone and able to communicate at the second bandwidth, wherein the second coverage zone is selected based upon a delivery latency of the second coverage zone.

13. The subscriber unit of claim 12, wherein the processing system is further programmed to make a selection of the second coverage zone from a plurality of second coverage zones.

14. The subscriber unit of claim 12, wherein the processing system is further programmed to make a selection of the second coverage zone from a plurality of second coverage zones, the selection based upon a traffic load experienced by the second coverage zone.

15. The subscriber unit of claim 12, wherein the processing system is further programmed to continue to communicate with the first coverage zone while communicating with the second coverage zone.

16. The subscriber unit of claim 12, wherein the processing system is further programmed to reacquire communications with the first coverage zone after completing communications with the second coverage zone.

17. The subscriber unit of claim 12, wherein the processing system is further programmed to reacquire communications with the second coverage zone in response to receiving a notification that a specified minimum bandwidth is required for receiving the outbound message.

18. The subscriber unit of claim 12, further comprising a transmitter coupled to the processing system for sending an inbound message, wherein the processing system is further programmed to determine from information in the subscriber unit that the first bandwidth is insufficient for sending the inbound message.

19. The subscriber unit of claim 12, further comprising a transmitter coupled to the processing system for sending a registration message, wherein the processing system is further programmed to transmit the registration message to register with the second coverage zone.

20. The subscriber unit of claim 12, further comprising a transmitter coupled to the processing system for sending a registration message, wherein the processing system is further programmed to maintain a registration for service with the first coverage zone when communicating with the second coverage zone.

21. The subscriber unit of claim 12, further comprising a transmitter coupled to the processing system for sending a registration message, wherein the processing system is further programmed to register with the second coverage zone in response to receiving a notification indicating that the subscriber unit is required to register when coming within range of the second coverage zone.

22. The subscriber unit of claim 12, further comprising a transmitter coupled to the processing system for sending a deregistration message, wherein the processing system is further programmed, in response to leaving coverage of the second coverage zone, to:

reacquire communications with the first coverage zone; and send the deregistration message to deregister from the second coverage zone through the first coverage zone.

* * * * *